Patented Dec. 4, 1934

1,982,989

UNITED STATES PATENT OFFICE 1,982,989

PRODUCTION OF WATER-FREE ALCOHOLIC LIQUID MIXTURES

Adolf Gorhan, Liesing, near Vienna, Austria, assignor to Deutsche Gold- und Silber-Scheideanstalt vormals Roessler, Frankfort-on-the-Main, Germany, a company of Germany No Drawing. Application July 20, 1932, Serial No. 623,688. In Germany August 17, 1931

11 Claims. (Cl. 202—67)

This invention relates to the dehydration of liquids containing ethyl alcohol by treatment of such liquids with dehydrating salts.

In the specification of my United States patent application Serial No. 480,576 now Patent 1,879,847 of September 27, 1932 I have described the production of absolute alcohol from aqueous alcohol by treating the latter on the countercurrent principle with a solution or suspension in absolute alcohol of a dehydrating salt capable of removing the water and of passing during its own dehydration direct from the aqueous to the molten state in which condition it can again be dissolved in absolute alcohol ready for using again. In the specification of my aforesaid patent application there is described a carrying out of the process continuously by introducing the aqueous alcohol in vapour form at the foot of a column—e. g. a Raschig column—and allowing the alcoholic solution of the dehydrating salt to pass down the column. In particular potassium acetate has been mentioned as a specially suitable dehydrating salt for the process.

In the specification of my United States patent application Serial No. 572,838 there is described the use of a mixture of acetates particularly in the proportion of 70 per cent potassium acetate and 30 per cent sodium acetate in place of a single salt as dehydrating agent. Also in the same specification there is described the use of other mixtures of dehydrating salts for the same purpose.

I have now found that the process according to the specifications of either of the above mentioned applications for patent is not only useful for dehydrating ethyl alcohol, but that quite generally mixtures of organic liquids, containing ethyl alcohol as a constituent can be dehydrated in accordance with the process—namely, by treating the vapours containing water and alcohol with a solution or suspension of a suitable dehydrating salt or salts in absolute ethyl alcohol or in anhydrous mixtures of organic liquids containing ethyl alcohol as a constituent.

The problem of dehydrating mixtures of ethyl alcohol with other organic liquids, instead of pure previously concentrated alcohol, occurs in various places in industry. For example, the sulphite spirit factories produce during fermentation a crude product which, apart from the aldehyde and fusel oil impurities present in every crude spirit, contains methyl alcohol in varying quantities, for example up to 10 per cent and more, relatively to the ethyl alcohol present. Such a product, brought to concentrations of 90 per cent to 95 per cent of the total alcohol content, cannot be directly converted into absolute alcohol by the otherwise preferably employed dehydration process with the aid of azeotropic mixtures at ordinary or increased pressure, because the methyl alcohol, having a considerably lower boiling point, appreciably disturbs the azeotropic distillation. Up to the present, therefore, there has been no other way than to remove the methyl alcohol from the sulphite spirit by a separate distillation and then to subject the spirit that is free from methyl alcohol to dehydration by azeotropic distillation and, finally, when it is a question of the employment of the absolute alcohol for the purpose of a motor fuel or as an addition to solvents, to add the previously separated methyl alcohol as a valuable constituent. The employment of the dehydration process proposed by me, on the contrary, enables the mixture of ethyl alcohol with any desired quantity of methyl alcohol, previously concentrated to, for example, 90 to 95 per cent, to be directly converted into an anhydrous mixture of both alcohols with a total alcohol content of 99.8 per cent by weight and more, which product can then be directly employed for admixing in the case of motive substances and solvents.

The smooth course of the dehydration by my process, notwithstanding the presence of a mixture, is based on the fact that in the vessel or column down which a solution of the dehydrating salt in absolute alcohol flows, a distillation, but not a sharp fractionation, of the organic liquids of different boiling points takes place. Both ethyl alcohol and methyl alcohol rise upwards in the form of vapour whilst the dehydrating salt flows away downwards. Accordingly, my process proves to be applicable to mixtures of organic liquids of all kinds, even when the boiling points of the constituents—as, for example, in the case of methyl alcohol and ethyl alcohol—differ from each other by 15° C., or, it may be, to an even greater extent.

A similar case presents itself when, for example, it is required to dehydrate mixtures of ethyl acetate and excess of alcohol. Difficulties are usually encountered in the dehydration of such mixtures, because ethyl acetate, together with water and alcohol, form an azeotropic mixture in which the water is present to the extent of 9 per cent, so that a separation of the water by simple rectification is impossible. In order to dehydrate, for example, a mixture of ethyl acetate, alcohol and water, which contains water to the extent of about 10 per cent, one may proceed to apply my process by using a solution of potassium acetate, or potassium acetate and sodium acetate, in absolute alcohol which is allowed to flow in opposition to the vapours of the mixture. In this way, the water is entirely removed by the dehydrating salt or salts and is discharged from the column at the bottom, whilst the mixture of ethyl acetate vapour and alcohol vapour, which is accompanied by the main quantity of the absolute alcohol used for dissolving the salt or salts, is obtained at the head of the column in the anhydrous condition.

It has further been found that it is unnecessary to dissolve the dehydrating salts in pure absolute alcohol but that absolute alcohol mixed with other substances can be used for this purpose. For example, in the dehydration of sulphite spirit containing methyl alcohol it is advantageous to employ the end product of this dehydration—namely, a mixture of methyl alcohol and ethyl alcohol—in varying quantities for dissoving the salt and to make this solution flow in the dehydrating column. Similarly, in the case of the dehydration of mixtures of ethyl acetate and alcohol, it is possible to use absolute alcohol mixed with quantities of ethyl acetate, instead of pure absolute alcohol, for dissolving the dehydrating salt. In certain circumstances, no complete solution of the salt can be obtained in this case. Nevertheless it is possible, by stirring the molten salt into the mixture of alcohol and ethyl acetate, to obtain the undissolved fraction in such a finely divided distribution that the mixture on the whole may be treated as a liquid and especially be moved as one. In the column itself, a complete solution occurs as the dehydrating salt draws the water to it, so that the danger of a clogging by solid deposits in the column is entirely avoided.

The above process may be carried into effect with the use of dehydrating salts such as calcium chloride, sodium sulphide, magnesium chloride, magnesium nitrate, etc. and the alkali and earth alkali fatty acid salts.

What I claim is:—

1. The process of dehydrating a mixture of water-soluble organic liquids inert to the dehydrating salts used in the process containing water and ethyl alcohol and substances which will form azeotropic mixtures with water comprising vaporizing said mixture, then passing in countercurrent to said mixture a suspension of potassium and sodium acetate in the ratio of 70 parts to 30 parts in absolute alcohol in the vapor phase, then regenerating the water-containing salts by dehydrating an aqueous solution thereof by heating and then dissolving said regenerated salts in absolute alcohol while maintaining the fluid phase whereby the absolute alcoholic suspension thus obtained may again be used in the dehydrating process.

2. The process of dehydrating a mixture of water-soluble organic liquids inert to the dehydrating salts used in the process containing water and ethyl alcohol and substances which will form azeotropic mixtures with water comprising vaporizing said mixture, then passing in countercurrent to said mixture a suspension of potassium and sodium acetate in the ratio of 70 parts to 30 parts in non-aqueous ethyl alcohol in admixture with other organic liquids in the vapor phase, then regenerating the water-containing salts by dehydrating an aqueous solution thereof by heating and then dissolving said regenerated salts in non-aqueous ethyl alcohol in admixture with other organic liquids while maintaining the fluid phase whereby the suspension thus obtained may again be used in the dehydrating process.

3. The process of dehydrating a mixture of water-soluble organic liquids inert to the dehydrating salts used in the process containing water and ethyl alcohol and substances which will form azeotropic mixtures with water comprising treating the aqueous mixture in vapor form on the counter-current principle to the action of a solution in absolute alcohol of a fusible water-abstracting salt, driving the resultant aqueous salt solution by heat to its substantially anhydrous and at the same time molten state and dissolving the molten salt in absolute alcohol for reuse in the process.

4. The process of dehydrating a mixture of water-soluble organic liquids inert to the dehydrating salts used in the process containing water and ethyl alcohol and substances which will form azeotropic mixtures with water comprising treating the aqueous mixture in vapor form on the counter-current principle to the action of a solution of a fusible water-extracting salt in organic liquids containing ethyl alcohol as one constituent, driving the resultant aqueous salt solution by heat to its substantially anhydrous and at the same time molten state, condensing the water-free mixture vapor and dissolving the molten salt in a portion of the condensed water-free mixture vapor for reuse in the process.

5. The process of dehydrating a mixture of water-soluble organic liquids inert to the dehydrating salts used in the process containing water and ethyl alcohol and substances which will form azeotropic mixtures with water comprising causing the aqueous mixture in vapor form to ascend in contact with a solution of potassium acetate in organic liquids containing ethyl alcohol as one constituent in the form of a descending spray, driving the resultant aqueous potassium acetate to its substantially anhydrous and at the same time molten state, condensing the water-free mixture of organic liquids, dissolving the molten acetate in a portion of the condensed mixture and utilizing it as a spraying liquid in the process.

6. The process of dehydrating a mixture of water-soluble organic liquids inert to the dehydrating salts used in the process containing water and ethyl alcohol and substances which will form azeotropic mixtures with water comprising introducing the aqueous mixture in vapor form into the lower part of a column, spraying into the top of the column a solution of fusible water-abstracting salts in organic liquids containing ethyl alcohol as one constituent, leading off the water-free mixture vapor from the top of the column and condensing the same, conducting away the aqueous salts solution from the foot of the column, driving the latter by heat from its aqueous condition to its substantially anhydrous and at the same time molten state, returning the molten salts and also a portion of the condensed mixture vapor into admixture with one another and returning the salts solution so admixed to the top of the column.

7. The process of dehydrating a mixture of water-soluble organic liquids inert to the dehydrating salts used in the process containing water and ethyl alcohol and substances which will form azeotropic mixtures with water comprising introducing the aqueous organic liquid mixture in vapor form into the lower part of a column, spraying into the upper part of the column a solution of potassium acetate in organic liquids containing ethyl alcohol as one constituent, leading off the water-free mixture vapors from the top of the column and condensing the same, conducting away the aqueous solution of potassium acetate from the foot of the column, driving the potassium acetate solution from its aqueous state to its substantially anhydrous and at the same time molten state, returning a molten salt and a portion of the aforesaid condensed mixture vapor into admixture with one another and returning the resultant solution of the potassium acetate to the upper part of the column.

8. The process of dehydrating a mixture of water-soluble organic liquids inert to the dehydrating salts used in the process containing water and ethyl alcohol and substances which will form azeotropic mixtures with water comprising vaporizing said mixture, then passing in counter-current to said mixture a suspension of potassium and sodium acetate in absolute alcohol in the vapor phase, then regenerating the water-containing salts by dehydrating the aqueous solution thereof by heating and then dissolving said regenerated salts in absolute alcohol while maintaining the fluid phase whereby the absolute alcoholic suspension thus obtained may again be used in the dehydrating process.

9. The process of dehydrating a mixture of water-soluble organic liquids inert to the dehydrating salts used in the process containing water and ethyl alcohol and substances which will form azeotropic mixtures with water comprising vaporizing said mixture, then passing in counter-current to said mixture a suspension of potassium and sodium acetate in non-aqueous ethyl alcohol in admixture with other organic liquids in the vapor phase, then regenerating the water-containing salts by dehydrating an aqueous solution thereof by heating and then dissolving said regenerated salts in non-aqueous ethyl alcohol in admixture with other organic liquids while maintaining the fluid phase whereby the suspension thus obtained may again be used in the dehydrating process.

10. The process of dehydrating a mixture of water-soluble organic liquids inert to the dehydrating salts used in the process containing water and ethyl alcohol and substances which will form azeotropic mixtures with water comprising vaporizing said mixture, then passing in counter-current to said mixture a suspension of alkali acetates in absolute alcohol in the vapor phase, then regenerating the water-containing acetates by dehydrating an aqueous solution thereof by heating and then dissolving said regenerated acetates in absolute alcohol while maintaining the fluid phase whereby the absolute alcoholic suspension thus obtained may again be used in the dehydrating process.

11. The process of dehydrating a mixture of water-soluble organic liquids inert to the dehydrating salts used in the process containing water and ethyl alcohol and substances which will form azeotropic mixtures with water comprising vaporizing said mixture, then passing in counter-current to said mixture a suspension of alkali acetates in non-aqueous ethyl alcohol in admixture with other organic liquids in the vapor phase, then regenerating the water-containing acetates by dehydrating an aqueous solution thereof by heating and then dissolving said regenerated acetates in non-aqueous ethyl alcohol in admixture with other organic liquids while maintaining the fluid phase whereby the suspension thus obtained may again be used in the dehydrating process.

ADOLF GORHAN.